US005812808A

United States Patent [19]
Driker

[11] Patent Number: 5,812,808
[45] Date of Patent: Sep. 22, 1998

[54] TOTALLY PIPELINED COMPUTER, INTERCONNECTED WITH OTHERS

[76] Inventor: Benjamin Driker, 40 Brighton 1 Rd. #7N, Brooklyn, N.Y. 11235

[21] Appl. No.: 661,358

[22] Filed: Jun. 11, 1996

[51] Int. Cl.$^6$ ............................ G06F 15/76; G06F 15/16
[52] U.S. Cl. ............... 395/388; 395/800.29; 395/800.37
[58] Field of Search ..................... 395/800.37, 800.42, 395/384, 390, 381, 800.29

[56] References Cited

U.S. PATENT DOCUMENTS

| | | | |
|---|---|---|---|
| 3,958,227 | 5/1976 | Evans | 395/583 |
| 4,307,445 | 12/1981 | Tredennick et al. | 395/592 |
| 4,855,947 | 8/1989 | Zmyslowski et al. | 395/392 |
| 4,901,235 | 2/1990 | Vora et al. | 395/597 |
| 5,276,824 | 1/1994 | Skruhak et al. | 395/388 |

*Primary Examiner*—Larry D. Donaghue

[57] ABSTRACT

Totally pipelined computer, interconnected with others, comprising totally pipelined computer, a number of components interconnected in a pipeline: Control storage for control and input-output address maker, plurality of other control storage for corresponding plurality of data address makers, and another control storage for operators and operational registers. Any mentioned control storage contains, as a part of a program, a plurality of appropriate section of a control word. Control and input-output address maker issues control address to all mentioned control storage and receives its own section of control word. Plurality of data address makers receives plurality of corresponding sections of control word and issue corresponding plurality of data addresses to operands and results storage, which, in turn, is issuing and receiving data to and from operational registers and bus joint and to condition and status logic. Each clock cycle, new control address initiates new control word, sections of which contain all commands and addresses for enactment of next control and input-output address, by control and input-output address maker, and of next plurality of data addresses, by plurality of data address makers. Following in pipeline, new commands and data submitted to operators and operational registers facilitate performance of new primary (originated by the task) operations every clock cycle. Several clock cycles are allotted along pipeline to address makers, allowing the most complex address preparations during and without impairment of primary operations. Also comprising: interconnect of totally pipelined computer with other computers, operating via input-output devices with separate sending and receiving ports.

2 Claims, 1 Drawing Sheet

TOTALLY PIPELINED COMPUTER, INTERCONNECTED WITH OTHERS

BACKGROUND OF THE INVENTION

Presented invention relates to a field of digital computers.

It is known that pipeline saves time, because all stages of it perform some parts of complex operation simultaneously. If every stage operation takes equal time (clock cycle) and complex operations are entering pipeline every clock cycle, than new completed complex operation would appear every clock cycle at the end of the filled pipeline.

Some contemporary computers are using pipelines, but they did not achieve efficiency in their operations.

There are computers and microcomputers, processors and microprocessors having pipelines, as a part of their structure, performing pipelined operations when a favorable condition in a flow of instructions and data allows. They are unable to keep pipelines constantly running, stumbling when loading from memory comes, or in some conflicts in internal data passes, or at jumps and interrupts.

Totally pipelined computers, those having all components interconnected in a pipeline and performing all operations in it, are unknown.

Also, most of above mentioned computers have CPU, or central processing unit.

This CPU is a relic from the past, when circuit technology was awkward and very expensive. Then, when processing speed was not a dominating factor, it was assumed that concentration of control and computing ability in one unit, CPU, but instructions and data in another one, memory, brings substantial savings; it could be right then, but not today with a very advanced and miniaturized circuit technology.

Contemporary CPUs, striving for speed increase, can contain some internal memory, a number of registers and several operators, like ALU, or arithmetic-logic unit, multiplier, barrel shifter and etc. These operators can process several selected functions, simultaneously, in one clock cycle, receiving operands from and bringing results to these registers in the same clock cycle which accommodates propagation delay of the slowest operator.

Achievement of performance described in above sentence not only for some lucky clock cycles but for every clock cycle throughout any program is very desirable.

Computers dominated by CPUs cannot facilitate desired performance. CPU has no ability of passing constant flow of proper new operands and results from and to memory in every clock cycle. For example, to obtain random data, it fetches its address, being or not a portion of instruction, from the memory and later issues it back to the same memory for fetching mentioned data. It takes more than one cycle to do this and keeps idle some operators, waiting for this data to come, and stumbles operation of a pipeline, if employed.

An instruction set, a collection of enumerated instructions, makes CPU an awkward device. The number of instructions could be large, making decoding and control logic very complex and hard to implement, especially with more than one operator.

Many CPU's instructions very often serve their internal necessities rather than the task. For example: instruction fetching, move and exchange of data, addressing mode enactment, branching and etc. can be considered as housekeeping, but CPU spends many clock cycles only on them but not on primary operations (operations in expressions or algorithms of a processed task).

So CPU cannot achieve mentioned above desirable performance, the best and fastest mode of processing a task,—in which all applicable operators are enacted to perform new primary operations in a computational step (determined by the algorithm of this task) in a single clock cycle, and so forth for all following clock cycles to the end of a program.

From another perspective, this very existence of finite number of instructions deprives the freedom of full and versatile access to and usage of components and interconnects comprising computer, what very often becomes quite painful finding during development of applications with embedded CPUs.

Last paragraph about instructions,—they serve the purpose of control centralization and unavoidably increase processing time, being often incompatible with pipelined operations. For example, a simple group of commands, like: "fetch A from M1 and B from M2, operate on them and place result in M3", is encoded, as one from the instruction set, with added complexity of addressing modes, and then, on a run, the time is spent for its fetching, decoding and issuing decoded and logically proved commands to components involved in operation; very often during this time primary operations could not be performed.

VLIW, very long instruction word, computing arrangement emerged relatively recently. It has a lot of operators and can enact some of them in a single clock cycle. It needs special compiler to translate instructions in a sequential arrangement of commands and data, but cannot resolve problems brought by branches in a simple and economical way, using in their presence time wasting conditional execution. There are some enthusiasts trying to use VLIW combined with CPU, but both of them have conceptually unavoidable problems, which would not dissipate in mere presence of this combination.

Another aspect of related field is an ability to interconnect a number of computers for simultaneous joint (parallel) high speed real time operation on some portions of one big task, or on a number of interdependent tasks. Some solutions of this aspect need scheduling and synchronization, employing supervising processors or computers.

SUMMARY OF THE INVENTION

First object of this invention is a totally pipelined computer,—actually a simple constantly running pipeline, which sends new commands to, brings new data for and stores new results from the processing of primary operations in every clock cycle, serving its main purpose—to facilitate performance of plurality of new primary operations in a single clock cycle in every clock cycle of any program or programs. This pipeline performs all housekeeping, including change of addressing mode, branching (jumping) and interrupting, along its stages during and without impairment of primary operations; stages performing housekeeping operate simultaneously with following stages performing primary operations.

Second object of this invention is a simple interconnect of the totally pipelined computer of the first object with other computers, pipelined or not, for simultaneous joint high speed real time operation on one task or on a number of interdependent tasks.

Impairment of performance of primary operations, in all existing computers is caused mainly by:
1. Back and forth passes to and from main memory during the fetching of instructions and random addressing of operands.

2. Multiple cycle preparation for and actual exit to a branch routine and even more for the same to a subroutine or interrupt or return from them.
3. The mere existence of enumerated instructions with all limitations and complexities brought by them, including two above mentioned.

This impairment is avoided in the totally pipelined computer by:
1. Using only commands, which are directed to individual operators or units controlling preparation of addresses and selection of data passes.

These commands can control (without decoding) simple activities like on/off, or (with a very simple decoding) select one from a number of activities available from a single component like add, subtract, compare and so forth, or select one component from the number of available for a particular action like one from several registers.

Commands are parts of a constant width control word which is issued in every clock cycle. So all commands are issued in every clock cycle, but their content differs and can enable particular action, or forbid it, or select different choices and so forth.

The ability to select any combination of commands is unlimited.

Control word also contains: random addresses of operands and results, starting addresses of routines and blocks of data and input-output addresses.
2. Applying a part of the control word, section C, for preparation of control and input-output addresses, another part, section O, to the processing of primary operations, and plurality of other parts, sections D, for preparation of a plurality of data addresses (for operands and results). Each mentioned section has separate storage addressable by control address.

Different addressing modes can be used for any of the issued addresses, like described below.

Any issued control address, could be incremented previous address, or starting address of a routine or loop or returning address to a previous routine, and also any of them could be indexed; control and input-output address maker contains the means for enactment of these choices.

Any, from the plurality, of issued data addresses could be a random address of an operand or a result, indexed or not, or address issued to a specific location in a data block or returning to a previous location address, or incremented or decremented previous address, also any of them could be bit reversed, or bit manipulated; plurality of data address makers contains the means for enactment of these choices.

Enactment of various addressing modes is directed by commands of control word during and without impairment of primary operations.

Any particular design can implement all or some portions of mentioned addressing modes, or some different modes.

There is an operands and results storage, addressed by the plurality of data addresses and consequently issuing plurality of data to the processing of primary operations.

So, on a run, when new control address is issued, responding new control word is also issued, and its commands, addresses and consequent events along pipeline facilitate performance of plurality of new primary operations in every clock cycle.

Tables below show samples of control word sections:

Section C

| 1 | 2 | 3 | 4 | 5 | 6 | 7 |
|---|---|---|---|---|---|---|

Columns content:

1 — Routine start address.
2 — Input address.
3 — Output address.
4 — Jump choice, interrupt permit.
5 — Input-output enact.
6 — Indexing and loops choice.
7 — Control address mode choice.

Section D

| 1 | 2 | 3 | 4 | 5 |
|---|---|---|---|---|

Columns content:

1 — Data address, random or start of block.
2 — Indexing and loops control.
3 — Bit reverse and manipulation.
4 — Data bus driving source select.
5 — Data address mode choice.

Section O

| 1a...1n | 2a...2n | 3a...3n | 4a...4n | 5a...5n | 6 |
|---|---|---|---|---|---|

Columns content:

1a — Select first operand fed by a register
1n — Select last operand fed by a register.
2a — Select first data bus fed by a register.
2n — Select last data bus fed by a register.
3a — Select first register fed by a result.
3n — Select last register fed by a result.
4a — Select first register fed by a data bus.
4n — Select last register fed by a data bus.
5a — Enact first operator for some operation.
5n — Enact last operator for some operation.
6 — Watch for some condition on a result or data bus.

Interconnect with other computers is done by data transfer through input-output devices having separately addressable input and output ports. Totally pipelined computer sends data to a receiving port of a device, which sending port gives this data to other computer. Totally pipelined computer receives data from the sending port of another device, which receiving port takes this data from other computer.

THE DRAWING

FIG. 1 is a diagram of totally pipelined computer, interconnected with others.

DESCRIPTION OF PREFERRED EMBODIMENT

Figure 1:
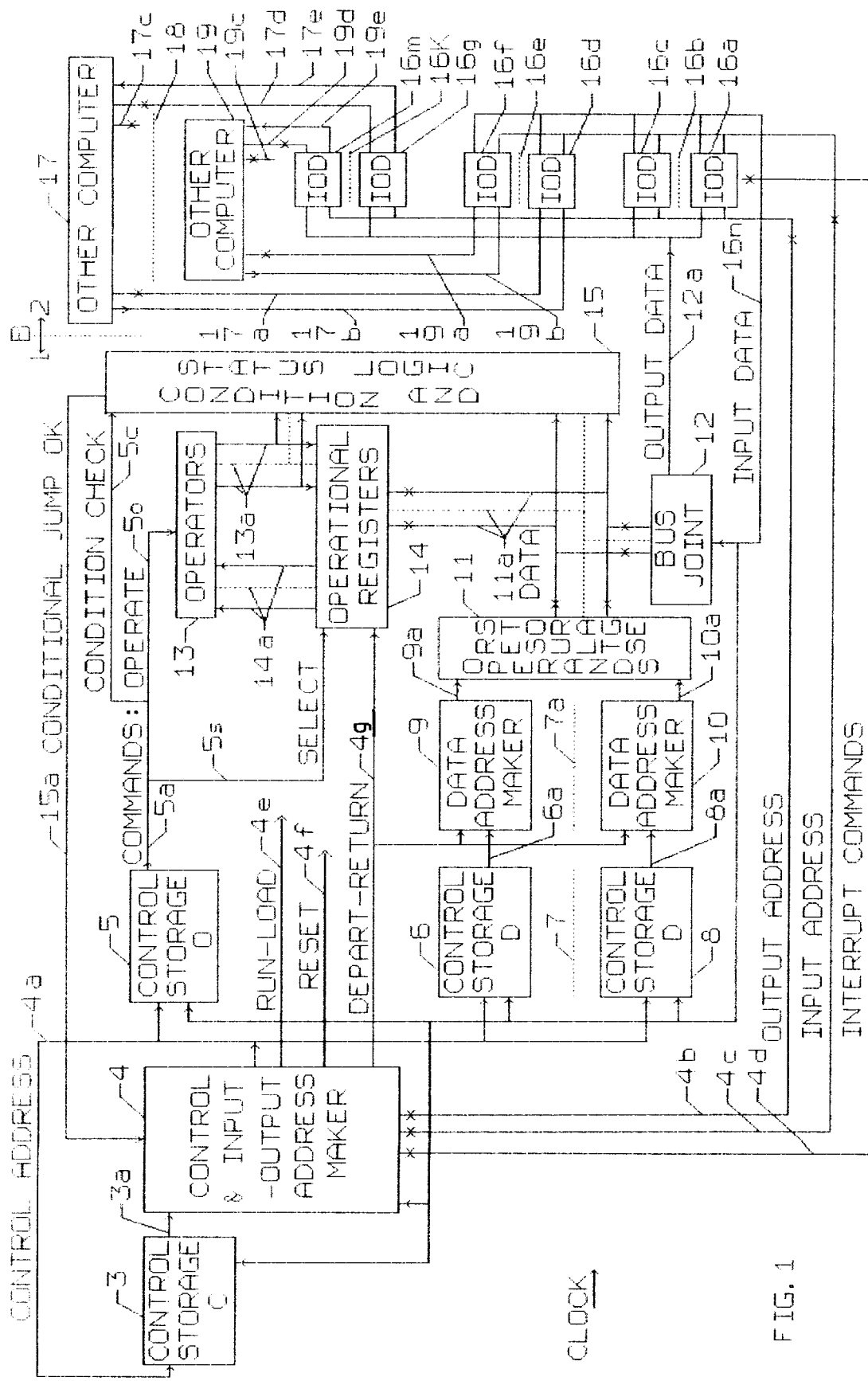

CLOCK, an input at the left edge of the FIG. 1 is a rectangular wave source, which period is a clock cycle. It is connected to all components and determines the rate in the flow of commands and data in the pipeline.

In all text, interconnects are appropriate means for transferring single or multiple signals between connected components. Bi or unidirectional flow through interconnects is shown on FIG. 1 by appropriate arrows.

Totally pipelined computer 1, shown on FIG. 1 to the left of the dotted vertical border line B, is comprising interconnected in pipeline components:

Control storage C—3, control storage O—5, plurality of control storage D—6—first, 8—last and 7—all in between, control and input-output address maker 4, plurality of data address makers—9—first, 10—last and 7a—all in between, operands and results storage 11 (it could be a plurality of storage banks, each having address and data terminals, or one multiport storage), bus joint 12, operators 13, operational registers 14 and condition and status logic 15.

Each control storage stores plurality of corresponding, by letters C, O, D, sections of control words. It accepts control address 4a issued through interconnect by control and input-output address maker 4.

Control and input-output address maker accepts through interconnect new section C of control word 3a, issued by control storage C every clock cycle. It has means for issuing control address 4a every clock cycle, including mentioned means for enactment of control address choices, means for accepting and enacting interrupts and interrupt commands 4d, and means for internal storing of parameters, when flow of routine in operation is interrupted by departure to some other routine, and for retrieving these parameters, when return to interrupted routine occurs and, consequently, means for issuing of depart and return commands 4g; also means for issuing and receiving input and output addresses 4b and 4c and for issuing of reset command 4f. All parameters are stored or/and retrieved, or replaced simultaneously in one clock cycle. Mentioned parameters are contents of some internal registers and counters. Mentioned interrupts could be initiated by software, or by some peripherals.

Any from the plurality of data address makers accepts through interconnect new section D of control word—6a—first, 8a—last, issued by corresponding control storage D every clock cycle. It has means for issuing data address—9a—first, 10a—last, every clock cycle, as well as mentioned means for enactment of data address choices. It also has means for internal storing of all its parameters for later use, and for retrieving them, simultaneously in one clock cycle, in response to depart and return commands, respectively.

Control storage O delays its output 5a, on several clock cycles for its synchronization with plurality of data addresses, so that the outputs 5a and 9a–10a are the consequence of the same control address, issued several clock cycles before. An internal or external train of registers is used for sequential passing of these delayed outputs. Output 5a is partitioned in commands: condition check 5c, operate 5o, and select 5s, Operands and results storage accepts through interconnect mentioned data addresses from plurality of data address makers and consequently issues and receives plurality of new data 11a every clock cycle.

Operators 13 accept operate commands 5o, from control storage O every clock cycle. They are a number of operators like ALU, multiplier, barrel shifter and etc., simultaneously performing selected operations in one clock cycle. Each operator can perform a number of operations, but only one operation in a time; it is enacted bysome part of operate commands to perform one chosen operation in a current clock cycle. Operands are accepted from and results are issued to operational registers 14 every clock cycle through interconnect.

Operational registers 14 are a plurality of registers for holding contents of operands and results. They have means for simultaneous internal connection of: plurality of operands 14a to some outputs, plurality of results 13a to some inputs and plurality of data 11a to some inputs and/or outputs of selected registers. They also have means for internal storing of all their contents for later use, and for retrieving them, simultaneously in one clock cycle, in response to depart and return commands, respectively. They accept new select commands 5s, from control storage O through interconnect every clock cycle. Select commands determine a pattern of internal connections of registers' inputs and outputs with interconnect of pluralities of operands, results and data in a current clock cycle.

Condition and status logic 15, accepting condition check commands 5c, from control storage O and pluralities of results 13a and data 11a, all through interconnect. It has means to determine appearance of a condition, indicated by command, on any result or data in a current clock cycle. By issuing conditional jump OK 15a signal to control and input-output address maker 4, it permits a jump to some routine when expected condition appears.

Bus joint accepts through interconnect all mentioned plurality of data and has means for connection of any from this plurality to output data 12a and/or input data 16n interconnects.

Now, assuming that program is loaded and any mentioned storage contains appropriate pluralities of commands, addresses and data, let as follow the flow of events along the pipeline running this program.

Control address, appearing on a first clock cycle, addresses a control word; its sections C and D are issued, but section O is delayed on several clock cycles. On a second clock cycle a different control address appears and all, mentioned in above sentence, actions are repeated, also all address makers perform some step in address preparation. On some consequent clock cycle all, mentioned in above sentence, actions are repeated, also section O of control word and plurality of data addresses, all consequential to control address of the first clock cycle, are issued and an issue of plurality of data follows; so operational registers and operators receive necessary commands and data and perform programmed primary operations. On all consequent clock cycles all, mentioned in above sentence actions, are repeated but in respect to the following, after first clock cycle, control addresses.

We see that the housekeeping imposes an after start delay before performance of primary operations begins; this delay is constant and reflects the longest time of address preparation by address makers. After this delay housekeeping and performance of primary operations pursue simultaneously. Each address maker spends constant number of clock cycles for address preparation. Some addresses do not need any preparation and are passed from control storage through address maker's internal train of registers to its output. Several clock cycles are spent for this passage. Addresses needed preparation are passed through or originated in internal modifying means of address maker, spending the same number of clock cycles. The number of allotted clock cycles is sufficient for the most complex address preparation.

To the right of mentioned border line B on FIG. 1, all peripherals 2 interconnected with the totally pipelined computer are shown. They comprise other computers 17—first, 19—last and 18—all in between and input-output devices (IOD).

Group of IODs 16a—first, 16c—last and 16b—all in between has sending ports (address 4c and data 16n) and receiving ports (address 4b and data 12a) connected to the totally pipelined computer.

Group of IODs 16d—first, 16f—last and 16e—all in between has sending ports (address 4c and data 16n) connected to the totally pipelined computer, but receiving ports to other computers: IOD 16d—to 17 (address 17a and data 17b) and IOD 16f—to 19 (address 19a and data 19b).

Group of IODs 16g—first, 16m—last and 16k—all in between has receiving ports (address 4b and data 12a) connected to the totally pipelined computer, but sending ports to other computers: IOD 16g—to 17 (address 17d and data 17e) and IOD 16m—to 19 (address 19d and data 19e).

All IODs issuing or receiving interrupt commands 4d to and from the totally pipelined computer.

Other computer 17, issuing or receiving through interconnect to IODs 16d and 16g—interrupt commands 17c.

Other computer 19, issuing or receiving through interconnect to IODs 16f and 16m—interrupt commands 19c.

Input-output devices having separate input and output address and data interconnects can simultaneously, in the same clock cycle, give and take data for and from processing by the totally pipelined computer, via bus joint without disrupting running pipeline.

Because some input-output devices serve as outputs or inputs of other computers, but respectively inputs or outputs to the totally pipelined computer, all these computers have no added complexities with interconnect for the joint simultaneous operation.

Loading or running of a program can be initiated by some peripheral and reflected by load or run commands 4e, issued by control and input-output address maker 4.

Pluralities of all mentioned sections of control words are loaded to their respective storage and plurality of data is loaded to operands and results storage. The source of loading is some peripheral connected through input data interconnect 16n to any control storage and also through bus joint 12—to operands and results storage.

When interrupt command 4d occurs, interrupt routine starting address is sent from some peripheral through output or input address interconnect 4b or 4c, to control and input-output address maker 4. Some peripheral signals initiating computer operation like load, run, reset and etc., are sent to control and input-output address maker 4 through data input interconnect 16n.

All, mentioned in the background of the invention, difficulties disappear, in totally pipeline computer because complexities and inconveniences in shown there instances are avoided by:

using a constant width control word, presenting all necessary information for all housekeeping and primary operations from the beginning and to the end of pipeline and having minuscule decoding complexity;

distributing control and addressing functions between address makers, accepting unidirectional flow of their own sections of control word which contains all necessary parameters for enactment of changes, imposed on a run by a program, or by peripheral interrupt, with minuscule control complexity;

placing control address maker, issuing control address, in front of plurality of control storage D, so that an addressed location of a control storage D passes some address to a corresponding data address maker which, in turn, passes it unchanged or modified for data retrieval from operands and results storage;

implementation of these modifications without disruption of pipeline operation, because sufficient number of clock cycles, for enactment of the most complex modifications, is allotted to address makers along pipeline;

so it can be summarized that back and forth passes along interconnect for addressing, control and data acquisition, being used in existing computers, spending a lot of processing time only on them, but not on primary operations, are completely excluded in totally pipelined computer, allotting all processing time to primary operations with simultaneous housekeeping.

Described above measures drastically reduced complexity of the totally pipelined computer, comparatively to existing computers.

Totally pipelined computer has all benefits of the previously mentioned desirable performance, which offers theoretically possible processing efficiency in every clock cycle, what results in a very high operational speed. Also, the size of a program is reduced, because each control word carries information equivalent to the same of many instructions of existing computers, and also many actions performed by their housekeeping instructions are not needed and excluded.

It is easy to comprehend all concepts and embodiment of totally pipelined computer; its implementation does not present a challenge to contemporary technology and can be done very quickly and easily, and in many variations suitable for general and/or special purpose computing.

Interconnect with other computers offers very simple and efficient means for joint real time fast operation on very large and complex tasks.

I claim:

1. Totally pipelined computer, interconnected with others described in a run mode, unless load command is mentioned, having totally pipelined computer, comprising:

control storage C, control storage O, plurality of control storage D, control and input-output address maker, plurality of data address makers, operands and results storage, bus joint, operators, operational registers and condition and status logic;

a program, a plurality of control words, each assembled from section C, section O and plurality of sections D and stored in corresponding by letters C, O, D control storage, and plurality of data words stored in operands and results storage;

all said control storage, receiving new control address issued to them every clock cycle by said control and input-output address maker and responding by issue of new corresponding sections of control word all through interconnect;

said control storage C issuing section C of control word to said control and input-output address maker;

said control storage O issuing section O of control word, partitioned in commands: condition check to said condition and status logic, operate to said operators, select to said operational registers;

said plurality of control storage D issuing corresponding plurality of sections D of control word to said plurality of data address makers;

said control and input-output address maker, accepting address making parameters from said section C of control word and having all means for enacting new control and input-output addresses in accordance with demand from any routine or peripheral and also means for internal storing of parameters and returning of them before and after interrupts, respectively, in one clock cycle;

said control and input-output address maker, accepting conditional jump OK signal from said condition and status logic allowing issuance of some routine starting address on certain condition, also, responding to software or peripheral interrupt by issuing depart and return commands to said plurality of address makers and to operational registers;

said plurality of data address makers, accepting address making parameters from said plurality of sections D of control word and having all means for enacting new plurality of data addresses in accordance with demand from any routine or peripheral and also means for internal storing of parameters and returning of them before and after interrupts and in response to depart and return commands, respectively, and issuing through interconnect, every clock cycle, plurality of new data addresses to said operands and results storage;

said control storage O having means for synchronization of its section O of control word output with plurality of data address outputs from said plurality of data address makers all in respect to the same, previously issued, control address;

said operands and results storage, responding to said plurality of data addresses by issuing through interconnect, every clock cycle, plurality of new data to said bus joint, operational registers and condition and status logic;

said operators, responding to said operate commands from control storage O by performing plurality of new primary operations every clock cycle on a plurality of new operands, accepting them from and issuing plurality of new results to said operational registers and to said condition and status logic, all through interconnect;

said operational registers, responding to said select commands from control storage O by accepting said plurality of data and results and issuing said plurality of operands to operators, and another plurality of results to operands and results storage, every clock cycle all through interconnect;

said condition and status logic, responding to said condition check commands from control storage O by monitoring some of said plurality of data and results for appearance of indicated by commands condition, and issuing conditional jump OK signal to control and input-output address maker;

said bus joint, passing input data to and output data from operands and result storage and/or operational registers, all through interconnect;

said control and input-output address maker issuing and/ or receiving output and/or input addresses and interrupt commands, also issuing run, load and reset commands, as a response to demands of a program or/and some peripheral signals received from data input interconnect, all said control storage, responding to said load command by accepting pluralities of corresponding to them sections of control word from data input interconnect;

said operands and results storage, responding to said load command by accepting plurality of data words from data input interconnect via bus joint.

2. Totally pipelined computer of claim 1 interconnected with others, which is attached to and operate in interconnect with other computers and input-output devices, comprising:

a group of input-output devices having sending and receiving address and data ports connected to totally pipelined computer;

a group of input-output devices having sending address and data ports connected to totally pipelined computer, but receiving address and data ports of each single device connected to a corresponding other computer;

a group of input-output devices having receiving address and data ports connected to totally pipelined computer, but sending address and data ports of each single device connected to a corresponding other computer;

all input-output devices issuing or receiving interrupt commands to and from totally pipelined computer;

other computers issuing or receiving interrupt commands to and from their single corresponding input-output devices.

* * * * *